United States Patent [19]

Nowak et al., deceased

[11] 4,079,637

[45] Mar. 21, 1978

[54] PICTURE TAKING (RECORDING) AND REPRODUCING (REPLAY) DEVICE

[75] Inventors: Johann Nowak, deceased, late of Vienna, Austria; by Otto Gesselauer, legal representative; by Leopold Srb, legal representative, both of Vienna, Austria; Robert Scheiber, Wiener Neudorf, Austria; Heinrich Cap, Grassau, Germany

[73] Assignees: Karl Vockenhuber; Raimund Hauser, both of Vienna, Austria

[21] Appl. No.: 594,785

[22] Filed: Jul. 10, 1975

[30] Foreign Application Priority Data

Jul. 11, 1974 Austria .................................. 5736

[51] Int. Cl.² ............................................. G11B 15/50
[52] U.S. Cl. ........................................ 74/816; 226/51; 242/201; 318/466; 74/567

[58] Field of Search ................ 318/466, 282; 352/172, 352/124; 226/51; 360/74, 96; 242/201; 74/567, 816

[56] References Cited

U.S. PATENT DOCUMENTS

| | | | |
|---|---|---|---|
| 3,707,326 | 12/1972 | Kadowaki | 242/186 |
| 3,900,174 | 8/1975 | Morimoto et al. | 242/201 |

*Primary Examiner*—Robert K. Schaefer
*Assistant Examiner*—Michael K. Mutter
*Attorney, Agent, or Firm*—Fleit & Jacobson

[57] ABSTRACT

The invention relates to a tape handling device associated with a picture-taking (recording) or reproducing (replay) device having a drive motor, a transmission gear to be actuated by the motor, a reversing device for reversing the sense of rotation of the drive consisting of the motor and gear train, and a control device likewise actuated by the motor.

6 Claims, 9 Drawing Figures

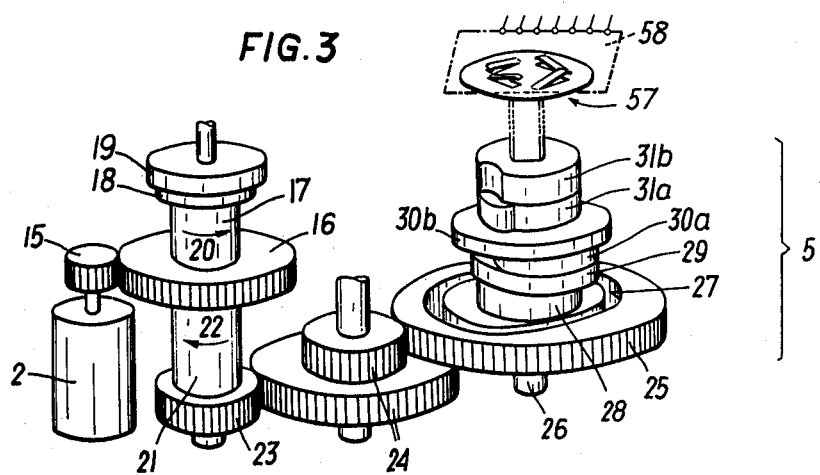
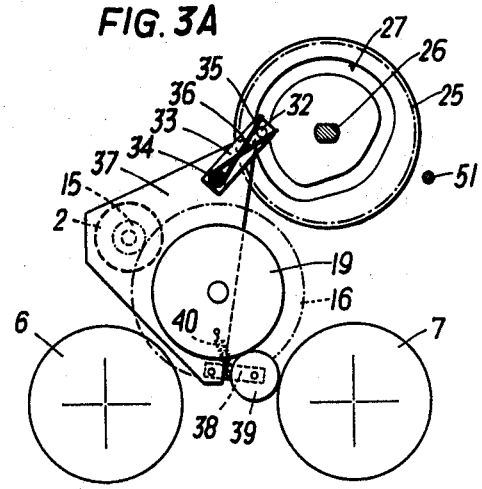
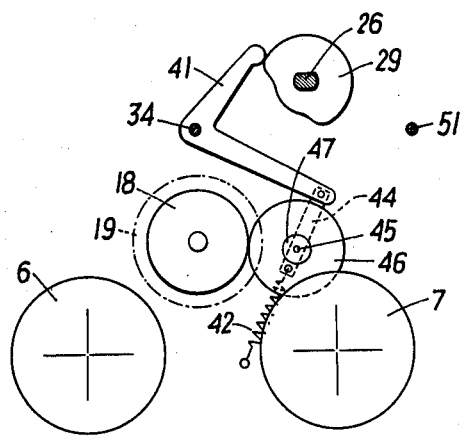
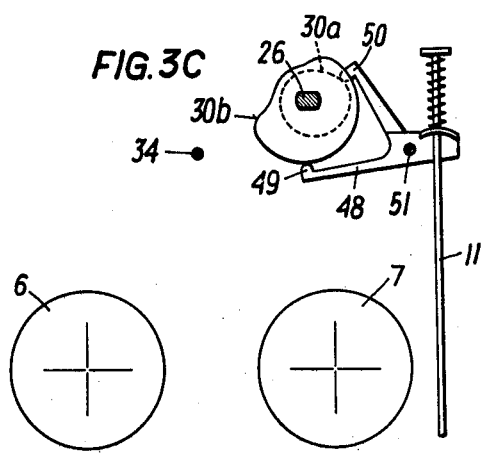
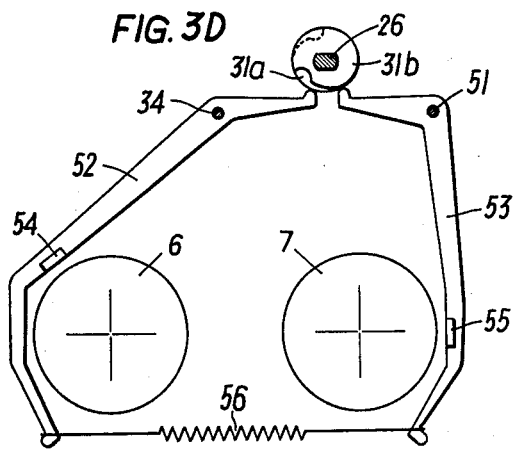

PICTURE TAKING (RECORDING) AND REPRODUCING (REPLAY) DEVICE

BACKGROUND OF THE INVENTION

In movie projectors and in tape recorders, the function to be performed by the driving elements such as motors is generally controlled by an operational mode switch made up of either a selector switch with several positions for the various functions, or of a set of push buttons. Such operational mode switches must be operated manually, requiring a certain effort. This effort can be exercised by the operator without any difficulty, but it poses problems in the case of devices to be equipped for remote control, inasmuch as the remote control signals which in most cases arrive as impulses, must be transformed with the aid of an electro-mechanical transducer. Traditionally, solenoids have been used to that end; however, they not only render the device more costly, but also require much space and weight, due to their usually very considerable number.

In addition, a device of the type mentioned at the outset has become known, in which the motor of the device itself was used as an electro-mechanical transducer capable of engaging or disengaging, as desired, the control equipment that had been designed as a program control system. Again, a solenoid was required to reverse the coupling.

SUMMARY OF THE INVENTION

The basic object of the invention is to create a tape handling device suitable for remote control without any use of solenoids. According to the invention, this can be accomplished in the following way: between the driving elements having a reversible direction of rotation, on the one hand and the gear transmission means and control device for setting the functions of the device, on the other hand, a pair of free-wheeling clutch devices that are effective in opposite directions, are interposed. A device for the control of the reversing in chronological sequence is provided. The afore-mentioned objective can be solved in that way very simply; the compulary chronological sequence results in a particularly advantageous application of such a device for cameras. There, we frequently find the problem that, when the camera shutter is released, the automatic exposure control system must be adjusted first, and the exposure of the film may come only afterwards. When applying the invention to a camera by having the motor first drive an iris diaphragm first in one direction until the exposure control system is in balance, and they only reversing the direction of rotation of the sprocket, thus producing a chronological sequence that is never achieved traditionally, with precision, by the use of sequence switches. The setting of the iris diaphragm may take place either, starting with an extreme position, against a return spring, or by means of a gear unit which is known as such, and which moves the diaphragm from one extreme position to the other.

Preferably, however, the control system includes an operational mode switch. In one direction of rotation of the drive means, this switch may first be moved into a desired position, and then, the part of the gear transmission selected in each case by the switch may be actuated by a change of the sense of rotation. This may be done in such a way that, during the first rotation of the motor, the operational mode switch turns, relatively slowly, from one position to the next one; this may be observed by the operator at the console with the aid of an indicating device. As soon as the operational mode switch has reached the desired position, the sense of rotation of the drive may be reversed, either by cutting in a gear unit or, preferably, by reversing the polarity of the motor.

However, the operation can be even further simplified when, in accordance with a further development of the invention the reversion control system has a follower control circuit as is well known. In that case, the operator may pre-select the desired operating index perhaps depressing a key, whereupon the operational mode switch will rotate until the follower control has assumed the pre-selected position. Further details of the invention may be identified on the basis of the following description of the design shown schematically in the drawing.

BRIEF DESCRIPTION OF THE DRAWING

FIG. 3 illustrates the drive of the device in axonometric representation.

FIGS. 3A to 3D are schematic representations of the mode of operation of the control system.

DETAILED DESCRIPTION OF THE DRAWINGS

Figure 1:
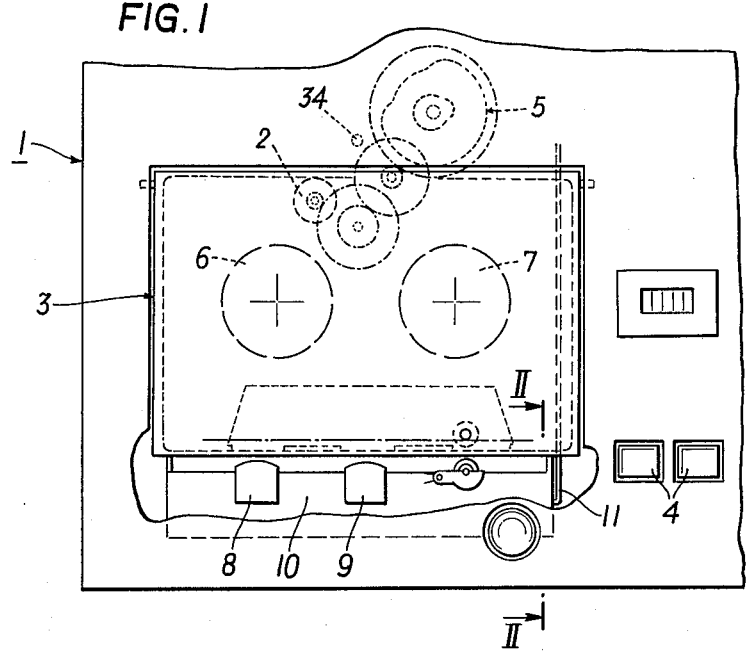
FIG. 1 illustrates part of a tape recorder designed in accordance with the invention.
Figure 2:
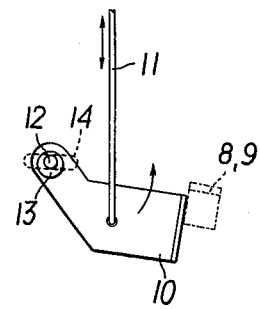
FIG. 2 shows a detail thereof.

FIG. 1 shows a cut-away portion of a magnetic tape recorder 1 which is driven by a motor 2. This motor 2 is mounted underneath a cassette receptacle 3 which is used to house a magnetic tape cassette. The recorder 1 possesses keys 4 for the pre-selection of the desired function of the instrument. A circuit, not shown here, for the reception of remote control signals may also be switched in parallel to the circuit of said keys 4. The control proper of the functions of the instrument is performed by a set of cams 5 that may be driven by motor 2. However, motor 2 is used also to drive the reels within the cassette, via reel drive wheels 6,7. In addition, motor 2 is also responsible for the movement of magnetic heads 8,9 on a magnetic head support 10. The transmission of movement takes place from the set of cams 5 by way of a connecting rod 11. The exact arrangement of heads 8, 9 and of the magnetic head support 10 may be seen in FIG. 2, in lateral view. The magnetic head support may be swiveled around an axis 12 which, by means of an eccentric adjusting wheel 13 can be adjusted in height along a slot 14, and may be adjusted on the other side along a further slot, not shown here, the axis of which runs at a right angle to the axis of slot 14, in the other direction.

In accordance with FIG. 3, the motor 2 with its motor pinion 15 drives a cog gear wheel 16 connected with two friction wheels 18, 19 via a free-wheeling clutch mechanism. The free-wheeling clutch mechanism 17 has been designed so that a drive can take effect only in the direction of arrow 20. Next, the drive takes hold via friction wheels 18, 19, as will be described later in FIGS. 3A to 3D.

On the other side of gear wheel 16, an additional free-wheeling mechanism is mounted which, however, produces movement only in the direction of arrow 22 but not in the sense of rotation of arrow 20. Consequently, depending on the sense of rotation of motor 2, either friction wheels 18, 19 are driven via the free-wheeling mechanism 17, or a cog, or gear, wheel 23 is driven via the free-wheeling mechanism 21.

When cog or gear wheel 23 is driven via free-wheeling mechanism 21, a ratchet wheel 25 on an axle 26 is driven via a reduction gear 24. The set of cams 5 is mounted on axle 26; with the aid thereof, a function of the device 1 as pre-selected by key 4 (FIG. 1) - e.g. "record" or "play-back" or "high-speed", etc. - may be set. Accordingly, we have here a kind of relay that actuates the greater energy of motor 2, to activate the various functions, by means of the negligible energy of a single pressure on any one of the keys 4 via cams 5. Clearly this presupposes that, when one of the keys 4 is depressed, the motor first will rotate in the sense of arrow 22 until the preselected spot has been reached whereupon wheels 18, 19 are set in motion by reversing the polarity via free-wheeling mechanism 17. The manner of this process, will be described in FIGS. 4 and 5.

Referring to FIGS. 3A to 3D, the function of cam set 5 may be explained as follows. As is shown in FIG. 3, ratchet wheel 25 has a milled keyway to receive cam 27. Adjoining this cam 27 and — separated by a largely cylindrical spacer 28 — are cams 29, 30a, 30b and 31a, 31b.

FIG. 3 shows the cam 27 engaged by a cam follower 32. The latter is attached to an arm 33 pivotable around an axis 34. Between axis 34 and cam follower 32, an open spring 35 has been stress tensed. This spring 35 comprises a pin 36 on a frame 37. The frame 37 is likewise pivotable around axis 34 and supports the motor 2 as well as the two coaxially disposed free-wheeling mechanisms. The motion derived from cam 27 is transmitted, therefore, to frame 37 by way of spring 35 and of pin 36, in a tension manner.

On frame 37, a friction cylinder 39 is held against friction wheel 19 by means of a spring 40. In the position of the cam 27 as shown in FIG. 3A, frame 37 is turned in such a way that the friction cylinder 39 transmits the drive from the friction wheel 19 onto the spool flange 7. Since friction cylinder 39, thereby fulfils solely the function of a reversing disk for the change of the sense of rotation, the spool flange 7, is driven almost directly by friction wheel 19, at a relatively high speed. This position of the cam set 5 corresponds, therefore, to a "Rapid Forward Motion".

FIG. 3B shows cam 29 in a position that corresponds to the position of cam 27 in FIG. 3A. A toggle lever 41 lies against the outer surface of cam 29, due to the tension of a spring 42. Toggle lever 41 is likewise pivotable around axis 34, and its other arm bears — pivotably — a supporting arm 44 on which a shaft 45 rests, and upon which spring 42 acts. Shaft 45 supports a larger friction wheel 46 that interacts with friction wheel 18 (see FIG. 3); on the other side, a friction cylinder 47 has been provided. When cam 29 is rotated clock-wise by approximately 90°, the flat of the cam is opposite lever 41 which, accordingly, moves clock-wise. During this movement, the tension of spring 42 is released, and friction cylinder 47 comes to lie against spool flange 7. In this way, however, the rotation of the friction wheel 18 is transmitted to the spool flange 7, at a considerable reduction of speed, corresponding to a slow forward motion for recording or re-play.

Since in the case of a rapid forward set-up, magnetic heads 8,9 must be turned away on the tape, but are placed in contact during recording or re-play, a device for the activating the support of magnetic heads 10 (see FIGS. 1, 2) is required. This device consists of cams 30a, 30b (FIG. 3C) which jointly control a lever 48. The two cams 30a and 30b have been designed to supplement each other, in automatically guiding cam followers 49, 50 which have been provided on lever 48. However, inasmuch as cam followers 48, 50 attack the axis of cams 30a, 30b at an angle of approximately 135°, the heavy portions of the two cams are not aligned. The motion derived from cams 30a, 30b rotates lever 48 around its axis 51, and this rotation is directly transmitted to rod 11 (see FIGS. 1, 2).

Finally, cams 31a, 31b control two brake levers 52, 53 which are pivotable around axes 34, 51, and brake shoes 54, 55 to decelerate spool flanges 6, 7. The two brake levers 52, 53 are tensed by a single spring 56, to execute a rotating movement toward the two cams 31a, 31b.

Figure 4:
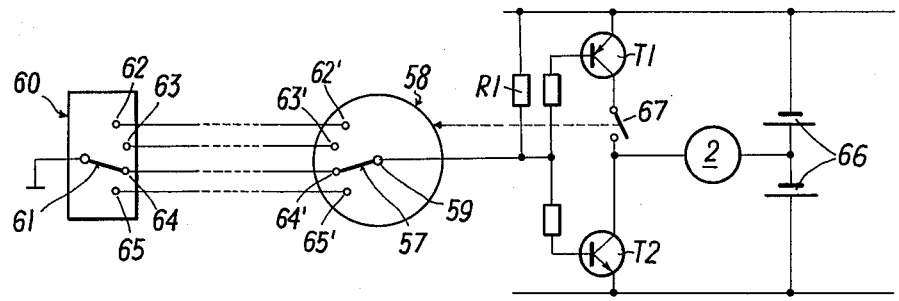
FIGS. 4 and 5 are schematic representations of the follower control system.
Figure 5:
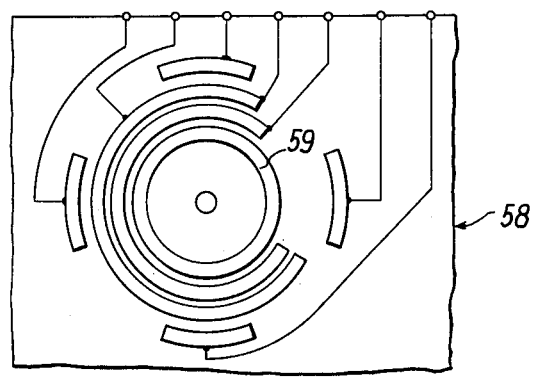

Four slide contacts 57 rest on shaft 26; they interact with a contact disk 58 that indicated schematically in FIG. 3 and shown in detail in FIG. 5. During the rotation of shaft 26, various contacts are controlled, successively, as has been indicated schematically in FIG. 4. Power is supplied through a closed circuit 59. By depressing keys 4, a pre-selecting device 60 is actuated with a contact arm 61 grounding in each case one of the four contacts shown, namely 62, 63, 64 or 65. The motor 2 is located between two transistors T1, T2 a divided source of direct current 66. In the position shown in FIG. 4, the base of transistor T2 is connected to ground. Since a switch 67 which is controlled by the contact disk 58 and located between transistor T1 and motor 2, is open, the motor does not receive any current from any direction.

However, if we now place the contact arm 61 against contact 65, the base of transistor T2 would receive current via resistance R1, transistor T2 would become conductive, and accordingly, the motor 2 would start running in one direction, namely in the sense corresponding to arrow 22 (FIG. 3). On the contact plate 58, the contacts that correspond to the contacts of the device 60, have been designated by 62' to 65'. The contacts 64 and 64' correspond to the stop position of the device in which switch 67 is also open. In all other positions of the set of cams 5, however, switch 67 is closed. Accordingly, when the motor 2 and thereby contact arm 57 is rotated from the position touching contact 64', switch 67 will be closed. As soon as the contact arm 57 arrives at the contact that is connected to ground via contact arm 61 (in accordance with the afore-mentioned example, this would be contact 65'), the base of transistor T2, i.e. the resistance R1 will be connected to ground, so that transistor T2 is switched off. Since, however, switch 67 is closed, motor 2 receives current in the other direction and, in consequence thereof, begins rotating in the sense of arrow 20 (FIG. 3), so that the device performs the function that has in each case been pre-selected, and switched in by the set of cams 5.

It may be mentioned in this connection that in practice, the follower control system described with the aid of FIG. 4, controls the pre-selected function within nano-seconds, so that the device begins operating practically instantly after a desired function has been pre-selected by depressing any one of keys 4 (FIG. 1).

As we have mentioned, the fact that switching in by means of the follower control system and the sequence of the functions of the device take place sequentially, is of particular advantage in applications to a camera. In any case, the advantage is realized of being able to drive two separate devices by a single motor without requiring any actuating devices for a coupling, or any similar devices therefor. Instead of the setting of the diaphragm aperture before taking a picture, a focusing device - familiar as such - may be actuated in the camera by a drive mechanism in accordance with the invention.

We claim:

1. In a tape handling device having at least two different modes of operation,
   gear means for transporting tape;
   drive means for rotating said gear means, said drive means rotating selectively in a first or a second direction of rotation;
   control means movable between at least two different positions for controlling the modes of operation of the device;
   a first free-wheeling clutch means interconnected between said drive means and said gear means for rotatably coupling said drive means to said gear means only when the drive means rotates in the first direction of rotation and for disconnecting said drive means from said gear means when the drive means rotates in the second direction of rotation;
   a second free-wheeling clutch means interconnected between said drive means and said control means for rotatably coupling said drive means to said control means only when the drive means rotates in the second direction of rotation and for disconnecting said drive means from said control means when said drive means rotates in the first direction of rotation;
   and rotation-reversing means connected to said drive means for sequentially reversing the direction of rotation of said drive means.

2. A device as claimed in claim 1 wherein said rotation-reversing means comprises means for reversing said drive means from rotating in a second direction of rotation after the control means has set the mode of operation, to rotating the drive means in the first direction of rotation for rotating said gear means.

3. A device as claimed in claim 1 further comprising preselector means for preselecting the position of the control means, and for actuating said drive means for rotating in the second direction of rotation.

4. A device as claimed in claim 3 wherein the rotation-reversing means comprises an electric follower control circuit.

5. A device as claimed in claim 1 wherein said drive means comprises an electric motor and a source of potential connected thereto, and the rotation-reversing means comprises polarity reversing means interconnected between the motor and the source.

6. A device as claimed in claim 1 wherein said control means comprises a plurality of cams mounted on a shaft, wherein said second free-wheeling clutch means couples said drive means to said control means to rotate said shaft to a preselected position.

* * * * *